US012564289B2

(12) United States Patent (10) Patent No.: US 12,564,289 B2
Wong (45) Date of Patent: Mar. 3, 2026

(54) SAFETY SWITCH WITH FOOL-PROOF FUNCTION AND TOASTER

(71) Applicant: Dongguan Yorkwell Electrical Appliance Co. Ltd., Dongguan (CN)

(72) Inventor: Ka Lok Ricky Wong, Dongguan (CN)

(73) Assignee: DONGGUAN YORKWELL ELECTRICAL APPLIANCE CO., LTD., Dongguan (CN)

( * ) Notice: Subject to any disclaimer, the term of this patent is extended or adjusted under 35 U.S.C. 154(b) by 1183 days.

(21) Appl. No.: 17/448,544

(22) Filed: Sep. 23, 2021

(65) Prior Publication Data

US 2023/0067398 A1 Mar. 2, 2023

(30) Foreign Application Priority Data

Aug. 30, 2021 (CN) .......................... 202111008390.3

(51) Int. Cl.
*A47J 37/08* (2006.01)
*H01H 3/32* (2006.01)
*H01H 9/30* (2006.01)

(52) U.S. Cl.
CPC ............ *A47J 37/0842* (2013.01); *H01H 3/32* (2013.01); *H01H 2009/305* (2013.01)

(58) Field of Classification Search
CPC .. A47J 37/0842; H01H 3/32; H01H 2009/305
USPC ........................................................ 99/327
See application file for complete search history.

(56) References Cited

FOREIGN PATENT DOCUMENTS

CN 2618533 Y * 3/2003 .............. A47J 37/08
JP 2015159908 A * 9/2015 .............. A47J 37/08

OTHER PUBLICATIONS

Machine Translation of CN2618533Y (Year: 2025).*
Machine Translation of JP2015159908A (Year: 2025).*

* cited by examiner

*Primary Examiner* — Edward F Landrum
*Assistant Examiner* — Thomas J Ward
(74) *Attorney, Agent, or Firm* — SHIMOKAJI IP

(57) ABSTRACT

A safety switch with fool-proof function and a toaster with the same are provided. The switch includes two pairs of first contacts connected to a live wire, a pair of second contacts connected to a zero line, and a trigger structure. The two pairs of first contacts are connected in series in a power circuit. A trigger gap is formed between the first contacts and the second contacts. The trigger structure is movable up and down to drive a pressing part out of and into the trigger gap. When the pressing part enters the trigger gap, the two pairs of first contacts are electrically connected respectively. Thus, the power circuit can be effectively turned off through the switch, thereby improving the safety performance. Moreover, the switch adopts a mechanical contact structure, which is not affected by high temperature and other electromagnetic interference signals, and has high safety.

7 Claims, 6 Drawing Sheets

SAFETY SWITCH WITH FOOL-PROOF FUNCTION AND TOASTER

RELATED APPLICATIONS

This application claims the benefit of priority to Chinese application No. 202111008390.3 filed on Aug. 30, 2021, which is hereby incorporated by reference in its entirety.

FIELD OF THE INVENTION

The present invention relates to technical field of safety switches, in particular to a safety switch with fool-proof function and a toaster with the same.

BACKGROUND OF THE INVENTION

Toaster, also known as automatic bread slice oven, bread toaster, is an electric cooker specially used to re-bake sliced bread. Since slices of bread are cooked food, an electric heater in the toaster usually works for a few minutes each time. For safety, there is a time controller in the toaster. When the heating time is reached, the time controller will automatically cut off the power to prevent the heater from burning dry for a long time. In practice, the power switch of the toaster may be jammed or stuck and fail, which brings certain safety hazards to the use of the toaster. Therefore, in order to ensure the safety performance of the toaster, safety regulations require an additional switch to add to the power circuit of the toaster, so that only when the two switches are turned on at the same time, the electric heater will start working, so as to avoid that the power circuit of the electric heater cannot be switched off when one of the power switches fails. However, in the prior art, the two power switches are electronic control switches. When the temperature is high, the power switches are likely to fail and the power cannot be turned off. Therefore, it is necessary to improve the safety switch structure of the toaster.

SUMMARY OF THE INVENTION

One objective of the present invention is to provide a safety switch with fool-proof function, which can effectively prevent the safety switch from being out of control and unable to turn off the power supply.

Another objective of the present invention is to provide a toaster, which can effectively prevent the safety switch from being out of control and unable to turn off the power supply.

To achieve the above objectives, the present invention provides a safety switch with fool-proof function which includes two pairs of first contacts connected to a live wire, a pair of second contacts connected to a zero line, and a trigger structure. The two pairs of first contacts are arranged at intervals and connected in series in a power circuit, and the two pairs of first contacts are arranged opposite to the pair of second contacts. A trigger gap is formed between the two pairs of first contacts and the pair of second contacts. The trigger structure is provided with a pressing part, and the trigger structure is movable up and down to drive the pressing part out of and into the trigger gap. When the pressing part is pushed into the trigger gap, the pressing part simultaneously applies a pressing force to the two pairs of first contacts and the pair of second contacts, so that either pair of first contacts is electrically connected, and the pair of second contacts is electrically connected.

Preferably, the switch includes a circuit substrate on which is provided with a first metal sheet assembly connected to the live wire and a second metal sheet assembly connected to the zero line. The first metal sheet assembly and the second metal sheet assembly are disposed back to back, the two pairs of first contacts are arranged on the first metal sheet assembly, and the pair of second contacts is arranged on the second metal sheet assembly. The first metal sheet assembly includes two pairs of a first movable piece and a first static piece, and either first movable piece is disposed facing the corresponding first static piece. The second metal sheet assembly includes a pair of a second movable piece and a second static piece, and the second movable piece is arranged facing the second static piece. The two first movable pieces are adjacent the second movable piece, and the trigger gap is formed between the two first movable pieces and the second movable piece. When the pressing part enters the trigger gap, the pressing part pushes the two first movable pieces close to the two first static pieces and the second movable piece close to the second static piece.

Preferably, the two first movable pieces and the second movable piece are respectively provided with an arc-shaped bend portion that is bent towards the trigger gap.

Preferably, the two first movable pieces are connected to the circuit substrate through the same first connecting member, and the two first static pieces are respectively connected to the circuit substrate through a second connecting member and a third connecting member.

Preferably, a control mechanism is also provided on the circuit substrate, and the control mechanism is arranged for controlling time that the pressing part stays in the trigger gap.

Preferably, the control mechanism includes a first hook and a locking member connected with the first hook. The trigger structure is provided with a second hook that is hooked with the first hook, the first hook is turned over so that the first hook is unhooked from the second hook, and the locking member is used to lock or unlock the first hook from the second hook.

Preferably, the locking member includes an electromagnet, and a magnet piece is arranged on the first hook and magnetically attracted to the electromagnet.

Preferably, outer surfaces of the first hook and the second hook are arc-shaped.

Accordingly, the present invention further provides a toaster including a toaster body, an electric heater and the aforementioned safety switch which are arranged on the toaster body.

In the present invention, the toaster is provided with a safety switch with fool-proof function. The safety switch includes two pairs of first contacts connected to a live wire, a pair of second contacts connected to a zero line, and a trigger structure. When the pressing part enters the trigger gap, and the pressing part simultaneously pushes the two pairs of first contacts and the pair of second contacts, so that the two pairs of first contacts are electrically connected, and the pair of second contacts are electrically connected, thereby connecting the power circuit having the electric heater. When the trigger structure drives the pressing part out from the trigger gap, the two pairs of first contacts and the pair of second contacts are reset, and the power circuit is disconnected. At this time, if either pair of first contacts is stuck, the power circuit can still be disconnected by the other pair of first contacts. Thus, through the above safety switch, the power circuit can be effectively turned off, thereby improving the safety performance of the toaster. Moreover, the safety switch adopts a mechanical contact structure, which is not affected by high temperature and other electromagnetic interference signals, and has high safety.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

In order to explain in detail the technical content, construction features, the purpose and effect achieved by the present invention, the following combined with the implementation and foe attached drawings are described in detail.

Figure 1:
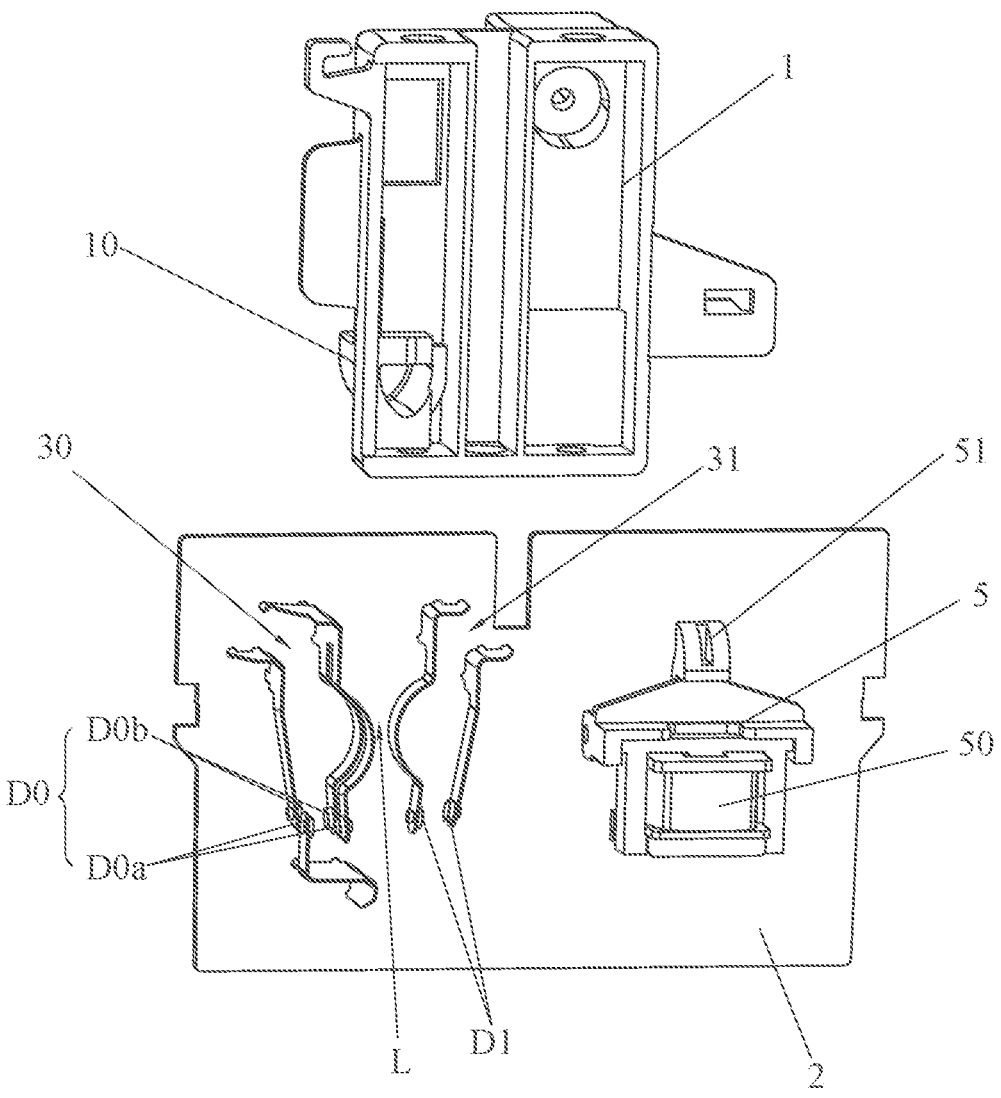
FIG. 1 is a perspective view of a safety switch of a toaster in off state according to an embodiment of the present invention.

A toaster for baking bread and other foods is provided, which includes a toaster body, an electric heater and a safety switch with fool-proof function which are arranged on the toaster body. The safety switch is used to prevent the power circuit in the switch from being out of control. Specifically, as shown in FIGS. 1 to 4, the safety switch includes two pairs of first contacts D0 connected to a live wire, a pair of second contacts D1 connected to a zero line, and a trigger structure 1. The two pairs of first contacts D0 are arranged in parallel and spaced apart, and in other words, one pair of first contacts D0 is arranged in parallel with and spaced apart from the other pair of first contacts D0. The two pairs of first contacts D0 are connected in series in the power circuit where the electric heater is located. The two pairs of first contacts D0 and the pair of second contacts D1 are arranged opposite to each other, and a trigger gap L is formed between the two pairs of first contacts D0 and the pair of second contacts D1. The trigger structure 1 is provided with a pressing part 10, and the trigger structure 1 can move up and down to drive the pressing part 10 into and out of the trigger gap L. When the pressing part 10 is pushed into the trigger gap L, the pressing part 10 simultaneously applies a pressing force to the two pairs of first contacts D0 and the pair of second contacts D1, so that either pair of first contacts D0 is electrically connected, and the pair of second contacts D1 is electrically connected. Specifically, as shown in FIG. 1, one first contact D0 in either pair of first contacts D0 is electrically connected to the other one first contact D0, and one second contact D1 in the pair of second contacts D1 is electrically connected the other one second contact D1.

Figure 3:
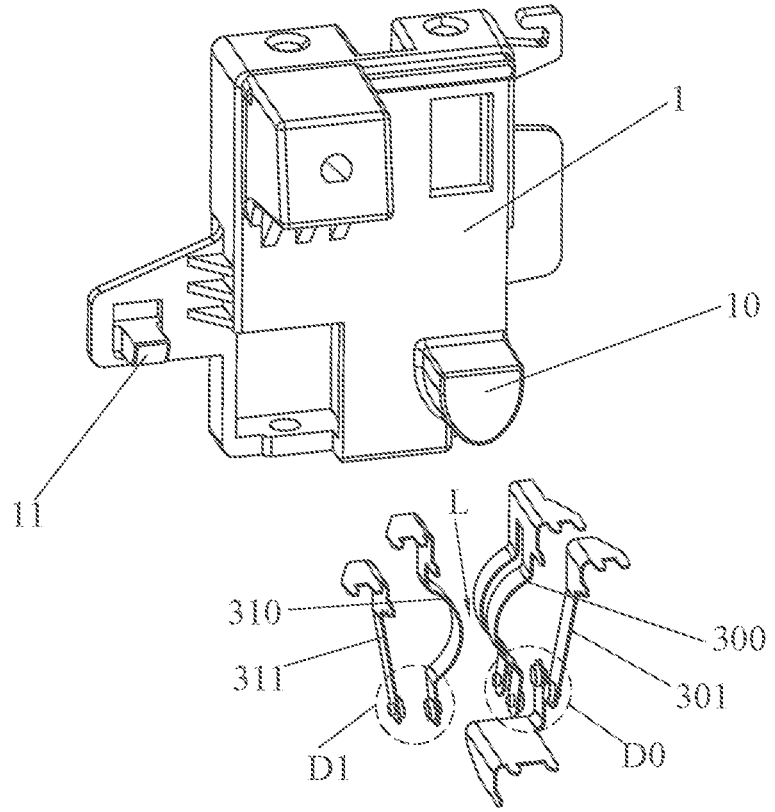
FIG. 3 is a perspective view showing a trigger structure in the non-triggered state according to the embodiment of the present invention.
Figure 4:
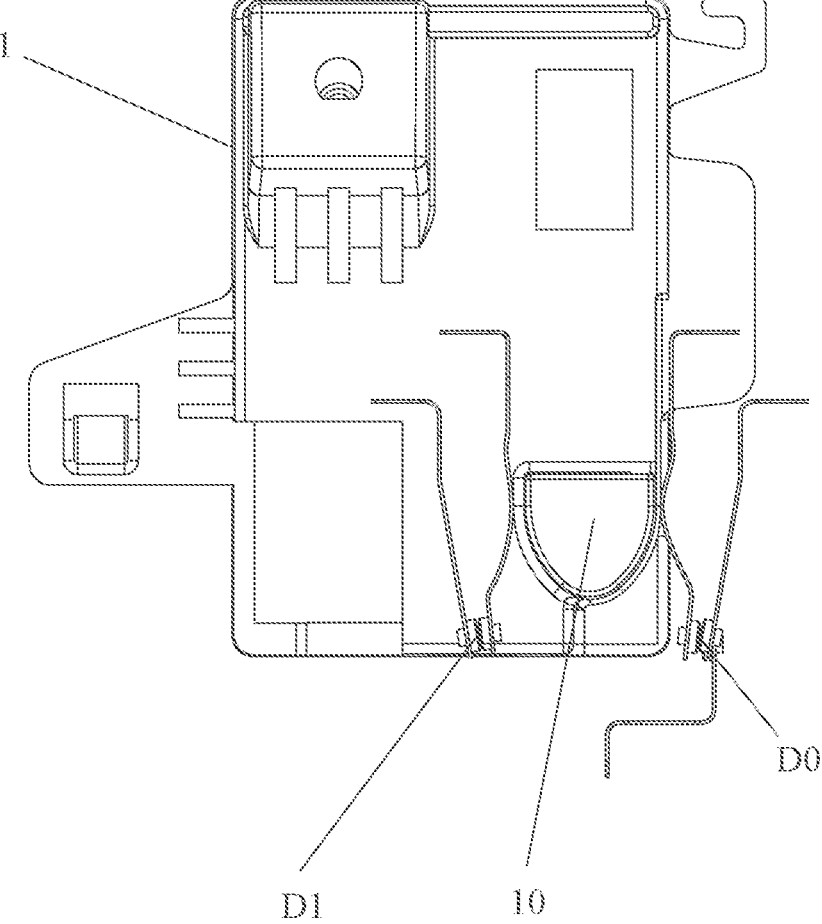
FIG. 4 is a plan view showing the trigger structure in the trigger state according to the embodiment of the present invention.

In the above embodiment, the power circuit of the electric heater on the toaster is provided with two pairs of first contacts D0 connected in series. More specifically, as shown in FIG. 1, one pair of first contacts D0 is D0*a*, and the other is D0*b*. As shown in FIG. 4, when the pressing part 10 enters the trigger gap L, the pressing part 10 simultaneously pushes the two pairs of first contacts D0 and the pair of second contacts D1, so that the two pairs of first contacts D0 and the pair of second contacts D1 are connected to connect the power circuit where the electric heater is located. Referring to FIG. 3, when the trigger structure 1 drives the pressing part 10 to exit the trigger gap L, the two pairs of first contacts D0 and the pair of second contacts D1 reset, and the power circuit is disconnected. At this time, if either pair of first contacts D0 (such as D0*a*) is stuck, the power circuit of the electric heater can still be disconnected by the other pair of first contacts D0 (D0*b*). Thus, through the above safety switch, the power circuit can be effectively turned off, thereby improving the safety performance of the toaster. Moreover, the safety switch adopts a mechanical contact structure, which is not affected by high temperature and other electromagnetic interference signals, and has high safety.

Further, referring to FIGS. 1 to 4 again, a circuit substrate 2 is also provided in the toaster. The circuit substrate 2 is provided with a first metal sheet assembly 30 connected to the live wire and a second metal sheet assembly 31 connected to the zero line. Specifically, the first metal sheet assembly 30 and the second metal sheet assembly 31 are disposed back to back. The two pairs of first contacts D0 are arranged on the first metal sheet assembly 30, and one pair of second contacts D1 are arranged on the second metal sheet assembly 31. Specifically, the first metal sheet assembly 30 includes two pairs of a first movable piece 300 and a first static piece 301, it's understandable that one first movable piece 300 and one first static piece 301 is a pair, and the first movable piece 300 in one pair is disposed facing the corresponding first static piece 301. More specifically, the two pairs of first contacts D0 are respectively arranged on the two pairs of first movable pieces 300 and first static pieces 301. The second metal sheet assembly 31 includes a pair of a second movable piece 310 and a second static piece 311, and the pair of second contacts D1 are respectively arranged on the second movable piece 310 and the second static piece 311. The two first movable pieces 300 are adjacent to the second movable piece 310, and the trigger gap L is formed between the two first movable pieces 300 and the second movable piece 310. When the pressing part 10 enters the trigger gap L, the pressing part 10 pushes the two first movable pieces 300 close to the two first static nieces 301 and the second movable niece 310 close to the second static piece 311. When the two first movable pieces 300 are close to the two first static pieces 301, specifically, the first movable piece 300 is close to the corresponding first static pieces 301, any one first contact D0 in the two pairs of first contacts D0 touch the corresponding first contact D0, so as to connect the fire line of the power circuit where the electric heater is located. When the second movable piece 310 is close to the second static piece 311, and one second contact D1 in the pair of second contacts D1 touches the other one second contact D1, thereby connecting the zero line of the power circuit where the electric heater is located, and then connecting the power circuit of the electric heater.

Preferably, in order to ensure that the first movable piece 300 and the second movable piece 310 are reset, the two first movable pieces 300 and the second movable piece 310 are provided with arc-shaped bend portion 32 that is bent towards the trigger gap L. When the pressing part 10 enters the trigger gap L, the pressing part 10 urges the curvature of the arc-shaped bend portions 32 on the first movable piece 300 and the second movable piece 310 to change (decrease), thereby making the bent portion 32 generate an elastic restoring force towards the trigger gap L. In this way, when the pressing part 10 exits the trigger gap L, the first movable piece 300 and the second movable piece 310 automatically move away from the first static piece 301 and the second static piece 311 under the action of the elastic restoring force of the bent portion 32, so as to ensure the automatic disconnection of the power circuit.

Figure 2:
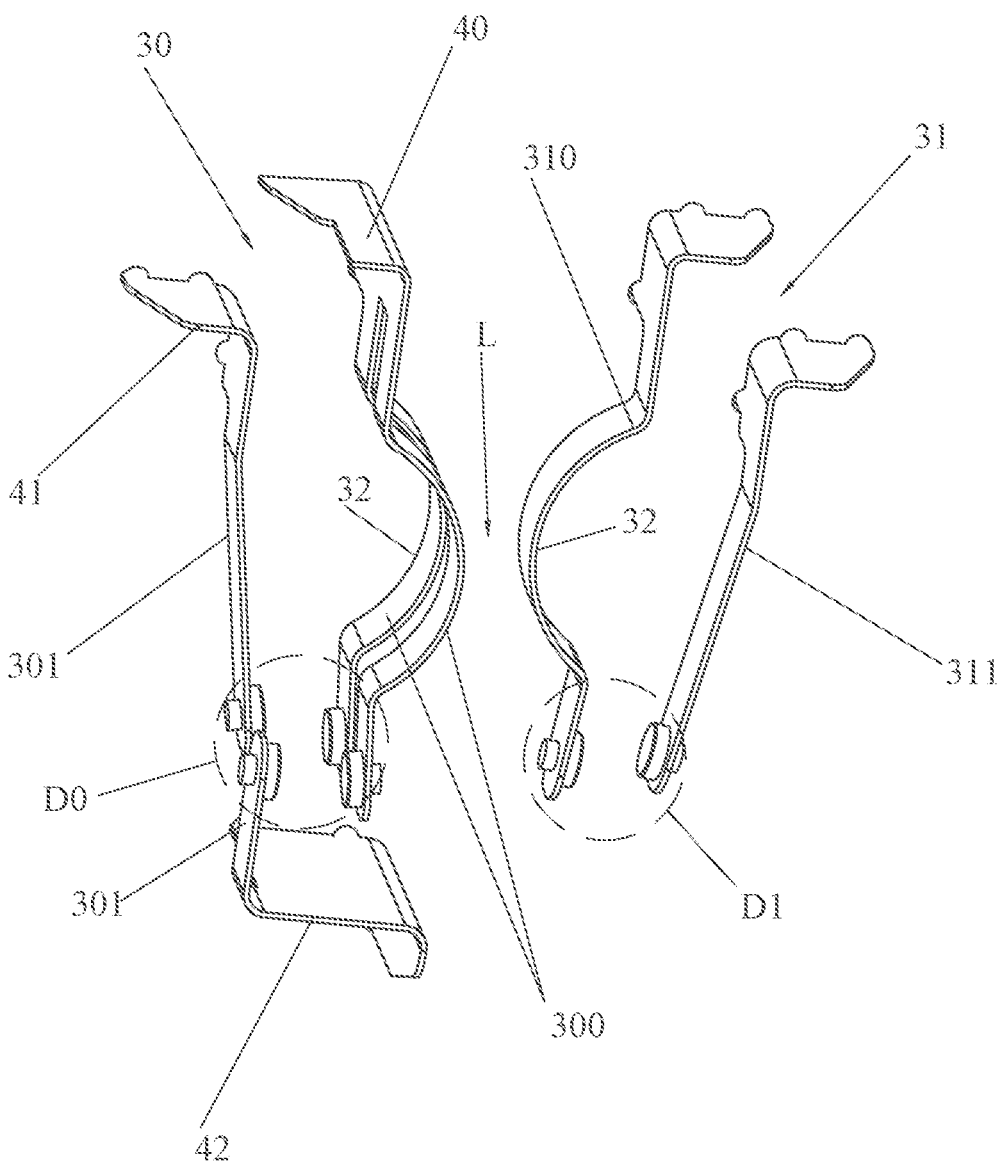
FIG. 2 is a perspective view of a first metal sheet assembly and a second metal sheet assembly in FIG. 1.

As a further improvement, as shown in FIG. 2, in order to avoid the two pairs of first movable piece 300 and first static piece 301 being stuck at the same time, the two first movable pieces 300 are connected to the circuit substrate through the same first connecting member 40, and the two first static pieces 301 are respectively connected to the circuit substrate through a second connecting members 41 and a third connecting members 42 respectively which are different. In this embodiment, the two first static pieces 301 are respectively connected to two different connecting members (the second connecting member 41 and the third connecting member 42), thereby avoiding two pairs of first movable piece 300 and the first static piece 301 is stuck at the same time for the same reason.

Figure 5:
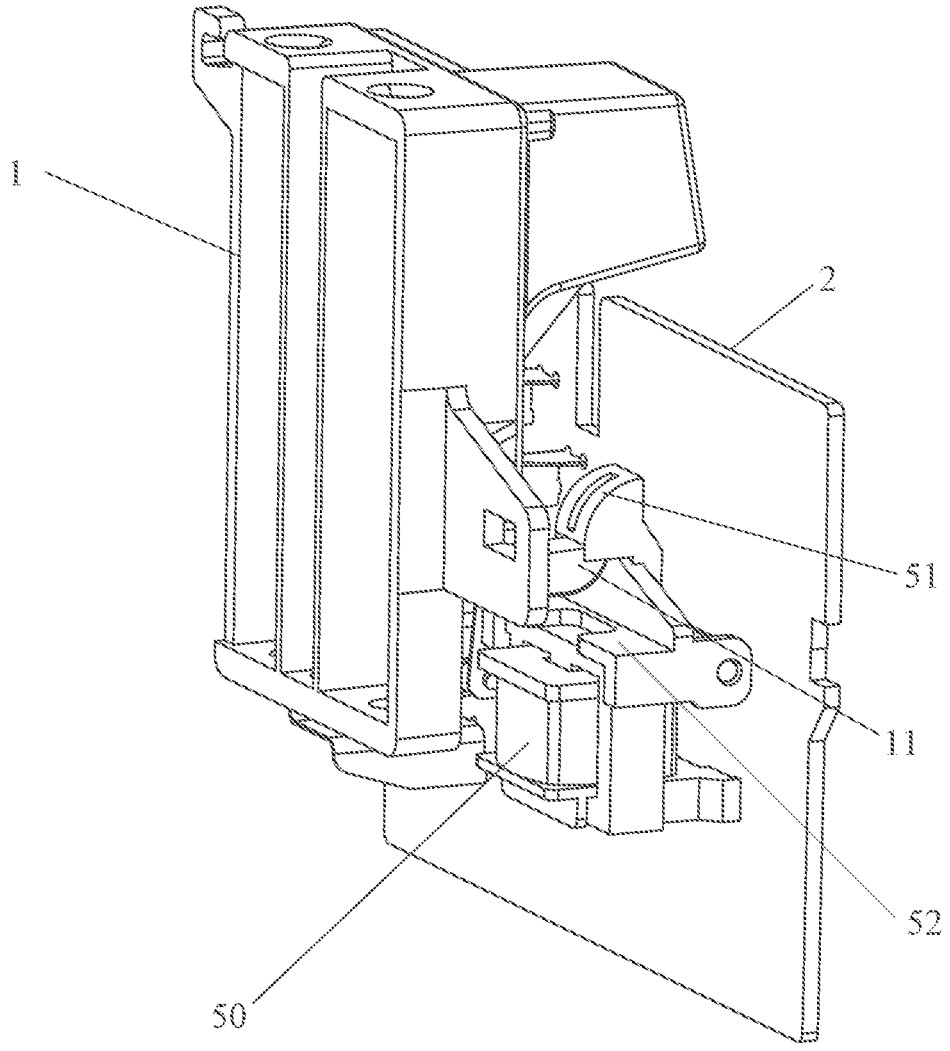
FIG. 5 is a perspective view showing working state of the control mechanism according to the embodiment of the present invention.
Figure 6:
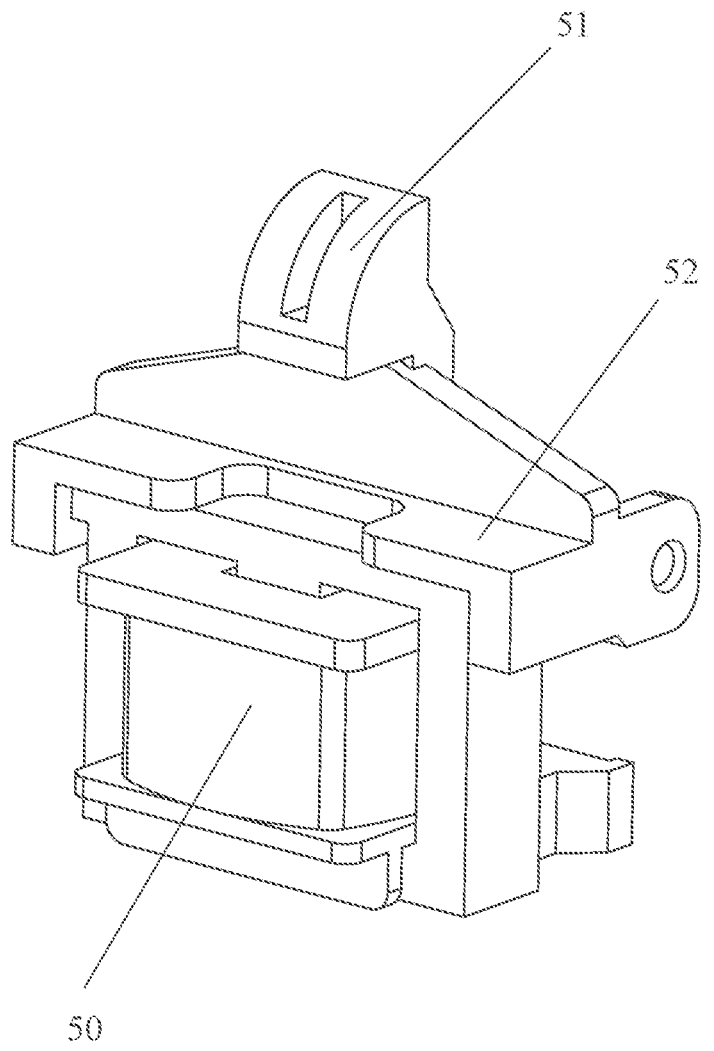
FIG. 6 is a perspective view of the control mechanism in FIG. 5.

As a further improvement, as shown in FIGS. 1, and 5-6, a control mechanism 5 is also provided on the circuit substrate 2. The control mechanism 5 is used to control the length of time that the pressing part 10 stays in the trigger gap L, so as to improve the automatic control effect of the toaster and increase the user experience. Specifically, the control mechanism 5 includes a first book 51 and a locking member 50 connected with the first hook 51, and the trigger structure 1 is provided with a second hook 11 that can be hooked with the first hook 51. The first hook 51 can be turned over to make the first hook 51 unhook from the second hook 11, and the locking member 50 is used to lock or unlock the first hook 51 from the second hook 11. When the trigger structure 1 moves down so that the pressing part 10 enters the trigger gap L, and the first hook 51 and the second hook 11 are hooked together, the locking member 50 locks the first hook 51. Thus, the trigger structure 1 is locked in this position. When the heating time is up, the locking member 50 unlocks the first hook 51, so that the first hook 51 is unhooked from the second hook 11, so that the trigger structure 1 drives the pressing part 10 to move up, and the power circuit of the electric heater is disconnected. More specifically, the locking member 50 includes an electromagnet (not shown), and a magnet piece 52 is provided on the first hook 51. The magnet piece 52 is magnetically attracted to the electromagnet. More specifically, the working process is as follows. When the trigger structure 1 is moved down so that the first hook 51 and the second hook 11 are hooked together, the electromagnet is with power and generates an electromagnetic force on the magnet piece 52, thereby locking the first hook 51 in this state. The toaster starts to heat. When the heating time is up, and the electromagnet loses power, the electromagnetic force acting on the magnet piece 52 disappears, and the first hook 51 is automatically unlocked. At this time, the first hook 51 can be turned over. Therefore, under the action of a pulling force provided by the trigger structure 1, the first hook 51 and the magnet piece 52 are turned over, so that the first hook 51 is unhooked from the second hook 11. Then the trigger structure 1 continues to move upward, and the toaster automatically stops heating.

Preferably, outer sides of the first hook 51 and the second hook 11 are both arc-shaped, so that the first hook 51 is hooked smoothly on the second hook 11.

While the invention has been described in connection with what are presently considered to be the most practical and preferred embodiments, it is to be understood that the invention is not to be limited to the disclosed embodiments, but on the contrary, is intended to cover various modifications and equivalent arrangement included within the spirit and scope of the invention.

What is claimed is:

1. A safety switch with fool-proof function, wherein the switch comprises two pairs of first contacts connected to a live wire, a pair of second contacts connected to a zero line, and a trigger structure, the two pairs of first contacts are arranged at intervals and connected in series in a power circuit, the two pairs of first contacts are arranged opposite to the pair of second contacts, a trigger gap is formed between the two pairs of first contacts and the pair of second contacts, the trigger structure is provided with a pressing part, and the trigger structure is movable up and down to drive the pressing part out of and into the trigger gap; when the pressing part is pushed into the trigger gap, the pressing part simultaneously applies a pressing force to the two pairs of first contacts and the pair of second contacts, so that either pair of first contacts is electrically connected, and the pair of second contacts is electrically connected;

wherein the switch comprises a circuit substrate on which is provided with a first metal sheet assembly connected to the live wire and a second metal sheet assembly connected to the zero line, the first metal sheet assembly and the second metal sheet assembly are disposed back to back, the two pairs of first contacts are arranged on the first metal sheet assembly, the pair of second contacts is arranged on the second metal sheet assembly; and the first metal sheet assembly comprises two pairs of a first movable piece and a first static piece, either first movable piece is disposed facing the corresponding first static piece, the second metal sheet assembly comprises a pair of a second movable piece and a second static piece, the second movable piece is arranged facing the second statie piece, the two first movable pieces are adjacent to the second movable piece, and the trigger gap is formed between the two first movable pieces and the second movable piece, when the pressing part enters the trigger gap, the pressing part pushes the two first movable pieces close to the two first static pieces and the second movable piece close to the second static piece;

wherein the two first movable pieces are connected to the circuit substrate through a same first connecting member, and the two first static pieces are respectively connected to the circuit substrate through a second connecting member and a third connecting member.

2. The safety switch as claimed in claim 1, wherein the two first movable pieces and the second movable piece are respectively provided with an arc-shaped bend portion that is bent towards the trigger gap.

3. The safety switch as claimed in claim 1, wherein a control mechanism is also provided on the circuit substrate, and the control mechanism comprising a first hook and a locking member connected with the first hook is arranged for controlling time that the pressing part stays in the trigger gap.

4. The safety switch as claimed in claim 3, wherein the trigger structure is provided with a second hook that is hooked with the first hook, the first hook is turned over so that the first hook is unhooked from the second hook, and the locking member is used to lock or unlock the first hook from the second hook.

5. The safety switch as claimed in claim 4, wherein the locking member comprises an electromagnet, and a magnet piece is arranged on the first hook and magnetically attracted to the electromagnet.

6. The safety switch as claimed in claim 4, wherein outer surfaces of the first hook and the second hook are arc-shaped.

7. A toaster, comprising a toaster body, an electric heater and a safety switch which are arranged on the toaster body, wherein the safety switch is according to claim 1.

* * * * *